UNITED STATES PATENT OFFICE.

AMOS G. ERNST, OF JUNCTION CITY, KANSAS.

TANNING COMPOSITION AND PROCESS OF MAKING THE SAME.

1,053,798.  Specification of Letters Patent.  Patented Feb. 18, 1913.

No Drawing.  Application filed April 8, 1912. Serial No. 689,377.

*To all whom it may concern:*

Be it known that I, AMOS G. ERNST, a citizen of the United States, residing at Junction City, in the county of Geary and State of Kansas, have invented certain new and useful Improvements in Tanning Composition and Processes of Making the Same; and I do declare the following to be a full, clear, and exact description of the invention, such as will enable others skilled in the art to which it appertains to make and use the same.

This invention relates to an improved composition for tanning furs and leathers and process for making the same.

The object of the invention is to provide a vegetable liquid or composition for efficiently and rapidly tanning hides and skins, and also for tanning prepared leather.

This composition is composed of soft water, malted barley, white corn meal, rye chop, compressed yeast, potato balls and sumac berries.

In preparing the composition, a vessel of any suitable size, either of wood or metal, being preferably the size of a large wash tub, is filled two-thirds full with from nine to fifteen gallons of soft water, then one-half bushel of good, fresh ground malted barley, such as is obtained from the brewers, is placed therein; then one peck of white corn meal and one peck of rye chop finely ground are added to the barley and the mixture thoroughly agitated, and the vessel disposed in a warm place. White meal is used in preference to yellow, as the yellow is liable to stain white wools or furs. One-half pound of compressed yeast is then added to this mixture, and the vessel is covered and allowed to stand until the mixture ferments and settles, and then one quart of potato balls, such as are obtained from the tops of potato vines, or balls grown on the Canadian thistle, are added, the latter being preferred as they are stronger. To this mixture is then added one gallon of sumac berries which have been gathered in the greenish yellow stage before they have become dry. This mixture is then ready for the immersion of the hides or skins therein, which, when subjected to the tanning composition, must be in a soft, flexible, clean condition. It is, of course, understood that the green hides will first be fleshed and the hair thoroughly cleansed, and if the hides are dry they will first be soaked in water to render them soft and flexible in condition to absorb or be affected by the tanning composition.

The hides in proper condition are placed in the above described tanning composition, where they are allowed to remain until thoroughly tanned, eight days being usually required for small, thin hides, and from twenty to thirty for heavy hides. The hides or skins must be lifted and the mixture agitated at least once a day.

This composition will tan any kind of hide with the hair on or off, and after being tanned, the leather or skin may be treated in the usual manner.

I claim as my invention:

1. A tanning composition consisting of soft water, ground malted barley, corn meal, ground rye chop, yeast, potato balls and sumac berries thoroughly commingled.

2. A tanning composition composed of from nine to fifteen gallons of soft water, one-half bushel of fresh ground malted barley, one peck of corn meal, one peck of rye chop ground fine, one-half pound of compressed yeast, one quart of potato balls and one gallon of sumac berries.

3. A method of producing a tanning composition which consists in combining malted barley, corn meal and ground rye chop with soft water, then thoroughly agitating the mixture and adding thereto compressed yeast, then allowing the mixture to stand until it has fermented and settled, then adding one quart of potato balls and one gallon of sumac berries, and then thoroughly commingling the ingredients.

In testimony whereof I have hereunto set my hand in presence of two subscribing witnesses.

AMOS G. ERNST.

Witnesses:
  M. I. SHOEMAKER,
  M. LOUISE DIXON.

---

Copies of this patent may be obtained for five cents each, by addressing the "Commissioner of Patents, Washington, D. C."